(12) United States Patent
Falco, Jr. et al.

(10) Patent No.: US 8,587,608 B2
(45) Date of Patent: Nov. 19, 2013

(54) PREVENTING PIXEL MODIFICATION OF AN IMAGE BASED ON A METRIC INDICATING DISTORTION IN A 2D REPRESENTATION OF A 3D OBJECT

(75) Inventors: Peter F. Falco, Jr., Saratoga, CA (US); Gavin S. P. Miller, Los Altos, CA (US); Michael O. Clifton, Scotts Valley, CA (US); Nathan A. Carr, San Jose, CA (US); Nikolai Svakhin, San Jose, CA (US); Aravind Krishnaswamy, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1154 days.

(21) Appl. No.: 12/202,173

(22) Filed: Aug. 29, 2008

(65) Prior Publication Data

US 2013/0121612 A1 May 16, 2013

(51) Int. Cl.
*G09G 5/00* (2006.01)
(52) U.S. Cl.
USPC ......................................................... 345/607
(58) Field of Classification Search
USPC ......................................................... 345/607
See application file for complete search history.

(56) References Cited

U.S. PATENT DOCUMENTS

| | | | |
|---|---|---|---|
| 5,107,444 A * | 4/1992 | Wu | 345/419 |
| 6,750,864 B1 | 6/2004 | Anwar | |
| 6,965,846 B2 | 11/2005 | Krimmer | |
| 2002/0015052 A1* | 2/2002 | Deering | 345/647 |
| 2005/0168476 A1* | 8/2005 | Levene et al. | 345/582 |

OTHER PUBLICATIONS

Igarashi et al.; "Adaptive Unwrapping for Interactive Texture Painting;" ACM, I3D '01 Proceedings of the 2001 symposium on Interactive 3D graphics, pp. 209-216, Mar. 2001.*
Carr et al.; "Painting Detail;" ACM, SIGGRAPH '04, pp. 845-852, Aug. 2004.*
Eugene Zhang, Konstantin Mischaikow, and Greg Turk, "Feature-Based Surface Parameterization and Texture Mapping", ACM Transactions on Graphics, Jan. 2005, pp. 1-27, vol. 24(1).
Pierre Alliez, et al., "Interactive Geometry Remeshing," 2002, Proc. SIGGRAPH 2002, ACM Trans. on Graphics 21, 3, pp. 347-354, Jul. 2002.
David Benson, et al., "Octree Textures," 2002, Proc. SIGGRAPH 2002, ACM Trans. on Graphics 21, 3, pp. 785-790, Copyright 2002 by the Association for Computing Machinery, Inc., Jul. 2002.
Nathan A. Carr, et al., "Meshed Atlases for Real-Time Procedural Solid Texturing," Apr. 2002, ACM Trans. on Graphics 21, 2, pp. 106-131.

(Continued)

*Primary Examiner* — Edward Martello
(74) *Attorney, Agent, or Firm* — Wolfe-SBMC

(57) ABSTRACT

A method, system, and computer-readable storage medium are disclosed for distortion-based mask generation. A respective distortion metric may be determined at each location of a plurality of locations in a two-dimensional representation of a three-dimensional object. The two-dimensional representation may be based on a view of the three-dimensional object. Each respective distortion metric may indicate a degree of distortion in a mapping between the respective location in the two-dimensional representation and a corresponding location in a surface texture of the three-dimensional object. The visual representation of the respective distortion metric at one or more of the plurality of locations may be displayed.

36 Claims, 9 Drawing Sheets

(56) References Cited

OTHER PUBLICATIONS

David (grue) DeBry, et al., "Painting and Rendering Textures on Unparameterized Models," 2002, Proc. SIGGRAPH 2002, ACM trans. on Graphics 21, 3, pp. 763-768, copyright 2002 by the Association of Computing Machinery, Inc., Jul. 2002.
Mathieu Desbrun, et al., "Intrinsic Parameterizations of Surface Meshes," EUROGRPAHICS 2002 / G. Drettakis and H.-P. Seidel, vol. 21 (2002), No. 2, The Eurographics Association and Blackwell Publishers 2002, 8 pages, Sep. 2002.
Xianfeng Gu, et al., "Geometry Images," 2002, Proc SIGGRAPH 2002, ACM Trans. on Graphics 21, 3, pp. 355-361, Jul. 2002.
Pat Hanrahan, et al., "Direct WYSIWYG Painting and Texturing on 3D Shapes," ACM Computer Graphics, vol. 24, No. 4, Aug. 1990, pp. 215-223.
George Karypis, et al., "Multilevel Algorithms for Multi-Constraint Graph Partitioning," Supercomputing last updated May 15, 1998, 25 pages, University of Minnesota, Department of Computer Science / Army HPC Research Center Minneapolis, MN 55455 Technical Report # 98-019.
Bruno Levy, et al., "Non-Distorted Texture Mapping for Sheared Triangulated Meshes," Proc. SIGGRAPH 98, pp. 343-352, Jul. 1998.
Bruno Lévy, et al., "Least Squares Conformal Maps for Automatic Texture Atlas Generation," Proc. SIGGRAPH 2002, ACM Trans. on Graphics 21, 3, pp. 362-371, Jul. 2002.
Stuart P. Lloyd, "Least Squares Quantization in PCM," IEEE Transactions on Information Theory, vol. IT-28, No. 2, Mar. 1982, pp. 129-137.
Pedro V. Sander, et al., "Texture Mapping Progressive Meshes," 2001, SIGGRAPH 2001, pp. 409-416, Aug. 2001.
Pedro V. Sander, et al., "Signal-Specialized Parametrization," Thirteenth Eurographics Workshop on Rendering Jul. 2002, pp. 87-98, © The Eurographics Association 2002.
Horst D. Simon, "Partitioning of Unstructured Problems for Parallel Processing," Computing Systems in Engineering 2, pp. 135-148, Feb. 1991, National Aeronautics and Space Administration.
Laurent Balmelli, et al., "Space-Optimized Texture Maps," Eurographics 2002, vol. 21, No. 3, The Eurographics Association and Blackwell Publishers 2002, 10 pages, Sep. 2002.
Nathan A. Carr, et al., "GPU Algorithms for Radiosity and Subsurface Scattering," Graphics Hardware (2003), The Eurographics Association Jul. 2003, pp. 51-59.
Floater, Michael S., "Mean value coordinates", *Computer Aided Geometric Design*, vol. 20 Issue 1, (Mar. 2003), pp. 19-27.
Floater, Michael S., "Parametrization and Smooth Approximation of Surface Triangulations", *Computer Aided Geometry Design*, 14(3), (Jun. 1996), pp. 231-250.
Garland, et al., "Hierarchical Face Clustering on Polygonal Surfaces", *Proceedings of the 2001 symposium on Interactive 3D graphics*, (Mar. 2001), 10 pages.
Igarashi, et al., "Adaptive Unwrapping for Interactive Texture Painting", *Proceedings of the 2001 symposium on Interactive 3D graphics*, (Mar. 2001), pp. 209-217.
Maillot, et al., "Interactive Texture Mapping", *Proceedings of the 13th international conference on Virtual systems and multimedia*, (Sep. 1993), pp. 27-34.
Sander, et al., "Multi-Chart Geometry Images", *Proceedings of the 2003 Eurographics/ACM SIGGRAPH symposium on Geometry processing*, (Jun. 2003), 10 pages.
Sheffer, et al., "Seamster: Inconspicuous Low-Distortion Texture Seam Layout", *Proceedings of the conference on Visualization '02*, (Oct. 2002), 8 pages.
Sloan, et al., "Importance Driven Texture Coordinate Optimization", *Computer Graphics Forum*, vol. 17, Issue 3, (Dec. 25, 2001), 8 pages.

\* cited by examiner

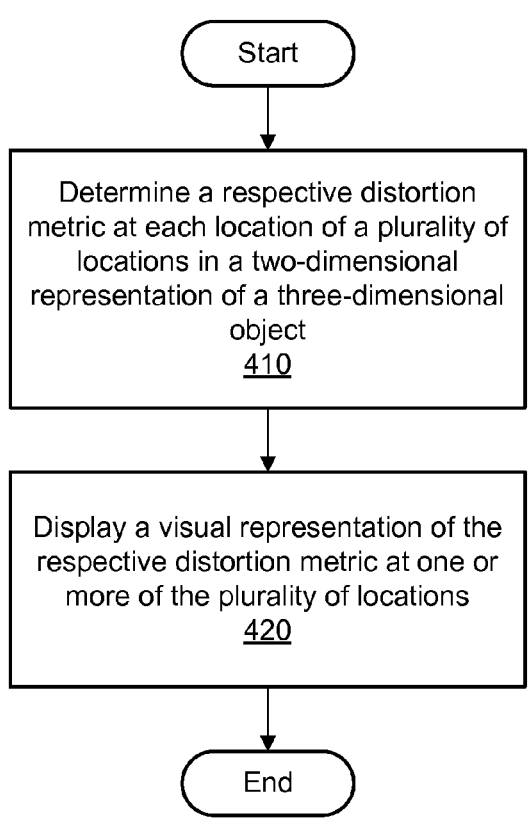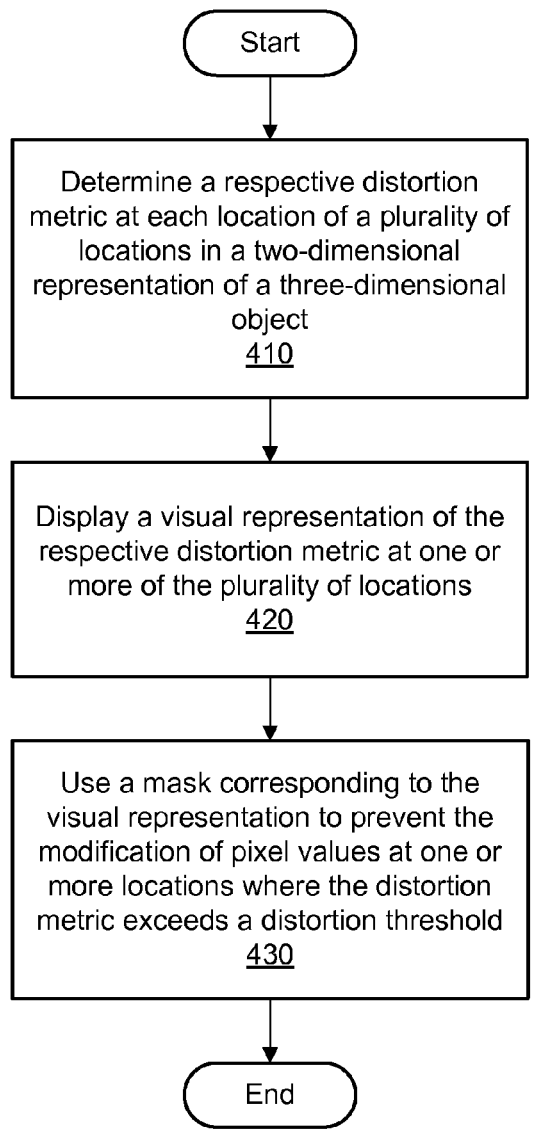
Figure 4A
Figure 4B

PREVENTING PIXEL MODIFICATION OF AN IMAGE BASED ON A METRIC INDICATING DISTORTION IN A 2D REPRESENTATION OF A 3D OBJECT

BACKGROUND

1. Field of the Invention

The present invention is directed to computer systems; and more particularly, it is directed to the editing of digital images using computer systems.

2. Description of the Related Art

Digital image editing is the process of creating and/or modifying digital images using a computer system. Using specialized software programs, users may manipulate and transform images in a variety of ways. These digital image editors may include programs of differing complexity such as limited-purpose programs associated with acquisition devices (e.g., digital cameras and scanners with bundled or built-in programs for managing brightness and contrast); limited editors suitable for relatively simple operations such as rotating and cropping images; and professional-grade programs with large and complex feature sets.

Digital images may include raster graphics, vector graphics, or a combination thereof. Raster graphics data (also referred to herein as bitmaps) may be stored and manipulated as a grid of individual picture elements called pixels. A bitmap may be characterized by its width and height in pixels and also by the number of bits per pixel. Commonly, a color bitmap defined in the RGB (red, green blue) color space may comprise between one and eight bits per pixel for each of the red, green, and blue channels. An alpha channel may be used to store additional data such as per-pixel transparency values. Vector graphics data may be stored and manipulated as one or more geometric objects built with geometric primitives. The geometric primitives (e.g., points, lines, paths, polygons, Bezier curves, and text characters) may be based upon mathematical equations to represent parts of vector graphics data in digital images. The geometric objects may typically be located in two-dimensional or three-dimensional space. A three-dimensional object may be represented in two-dimensional space for the purposes of displaying or editing the object.

SUMMARY

Various embodiments of systems, methods, and computer-readable storage media for distortion-based mask generation are disclosed. In one embodiment, a respective distortion metric may be determined at each location of a plurality of locations in a two-dimensional representation of a three-dimensional object. The two-dimensional representation may be based on a view of the three-dimensional object. Each respective distortion metric may indicate a degree of distortion in a mapping between the respective location in the two-dimensional representation and a corresponding location in a surface texture of the three-dimensional object. For example, the distortion may comprise oversampling distortion and/or oversampling distortion. In one embodiment, the distortion metrics may be determined using a graphics processing unit (GPU). A visual representation of the respective distortion metric at one or more of the plurality of locations may be displayed.

In one embodiment, a mask may be generated based on the respective distortion metric at each of the plurality of locations. The mask may be used to prevent the modification of pixel values at one or more locations where the distortion metric exceeds a distortion threshold. For example, after user input is received to apply paint to the three-dimensional object at the particular view, the mask may prevent application of the paint to at least one location at which the distortion metric exceeds the distortion threshold. The mask may comprise a soft mask such that full application of the user's paint input may be prevented in some locations (e.g., by applying "faded" paint). In one embodiment, the distortion metrics and mask may be dynamically updated upon modification of the view (e.g., modifying the position of the object or the zoom level of the display), modification of the resolution of a texture of the object, or modification of the parameterization of the object.

BRIEF DESCRIPTION OF THE DRAWINGS

FIGS. 4A and 4B are flowcharts illustrating methods for distortion-based mask generation according to one embodiment.

Figure 1:
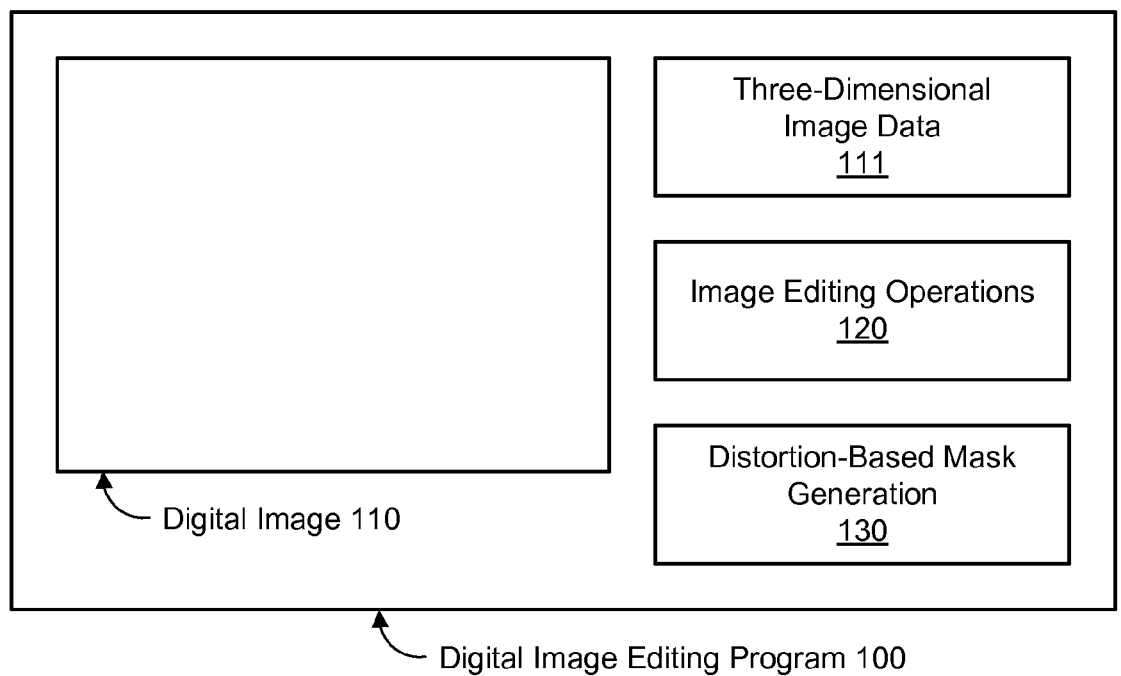
FIG. 1 is a block diagram illustrating an embodiment of a digital image editing program configured for distortion-based mask generation.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENTS

FIG. 1 is a block diagram illustrating an embodiment of a digital image editing program 100 configured for distortion-based mask generation. A digital image editing program 100, also referred to herein as an image editor 100, may be used to create and/or modify a digital image 110, also referred to herein as an image 110. The digital image editing program 100 may comprise a plurality of editing operations 120. The editing operations 120 may comprise suitable operations for modifying elements of the image 110. For example, various effects such as filters (e.g., Gaussian blur, median filter, add noise, reduce noise, fragment, unsharp mask), image adjustments (e.g., levels, curves, brightness/contrast, shadow/highlight), and other operations (e.g., resizing, cropping, thresholding, rotation, perspective distortion) may be applied to one or more images, selections within the image 110, or other suitable data related to the image 110. In one embodiment, a suitable product such as Adobe Photoshop®, Adobe Illustrator®, or Adobe AfterEffects® (available from Adobe Systems, Inc.) may be used as the image editor 100.

The image 110 may comprise two-dimensional (2D) image data, and at least a portion of the image 110 may be generated based on three-dimensional (3D) image data 111. The three-dimensional image data 111 may include a three-dimensional model of an object defined by a plurality of vertices in space. The plurality of vertices may define a triangle mesh. Using the image editor 100, a user may create a particular view of the object to represent the object within the two-dimensional boundaries of the imaging device. The view of the object may include a position relative to a camera view or viewpoint. The view may also include a zoom factor.

The surface of the three-dimensional object may be parameterized such that a texture map is wrapped onto the triangle mesh. The texture map may comprise a two-dimensional bitmap. Each triangle in the mesh may be mapped to a location in the corresponding two-dimensional image at the current view. Both the two-dimensional and three-dimensional domains include pixels. However, the mapping of pixels from one domain to the other is often not one-to-one. Thus, in mapping a two-dimensional bitmap to a three-dimensional object, distortion effects such as "warping" or "stretching" may occur.

Using the image editor 100, a user may seek to apply pixel values (also referred to herein as "paint") such as pixel colors and alpha values to portions of the three-dimensional object via its two-dimensional screen representation. For example, the user may desire to paint portions of the object using a paintbrush provided by the editing operations 120 of the image editor 100. However, due to the distortion present in some locations of the mapping between the three-dimensional object and its two-dimensional representation, the user's edits at these locations may be undesirably distorted. In one embodiment, locations having a relatively low distortion may be identified to permit the user to paint locations where a transfer of sufficient pixel details from the 2D domain to the 3D domain may be expected. In one embodiment, the low-distortion locations may approach a one-to-one correspondence between 2D screen pixels and 3D texture map pixels. A mask may be used to permit edits to pixels in low-distortion locations and prevent edits to pixels in high-distortion locations.

The digital image editing program 100 may comprise instructions to implement distortion-based mask generation functionality 130. As will be described in greater detail below, the distortion-based mask generation functionality 130 may comprise one or more operations to determine a distortion metric at various locations in a two-dimensional image. The distortion metric may indicate a degree of distortion in a mapping between a location in the two-dimensional image data and a corresponding location in a surface texture of the three-dimensional image data. In one embodiment, the distortion metric may be determined based on the surface parameters (e.g., the uv mapping), the camera position, the screen resolution, and the texture resolution for a particular location in the three-dimensional object. The distortion-based mask generation functionality 130 may also comprise one or more operations to generate a mask based on the values of the distortion metric at the various locations. The mask may be used to prevent modification (e.g., painting) of the image 110 or three-dimensional image data 111 at locations where the distortion metric indicates that the degree of distortion in the mapping is high (e.g., where the distortion metric exceeds a distortion threshold).

For example, the three-dimensional image data 111 may include a sphere, and the image 110 may include a two-dimensional representation of the sphere at a particular view.

Figure 2A:
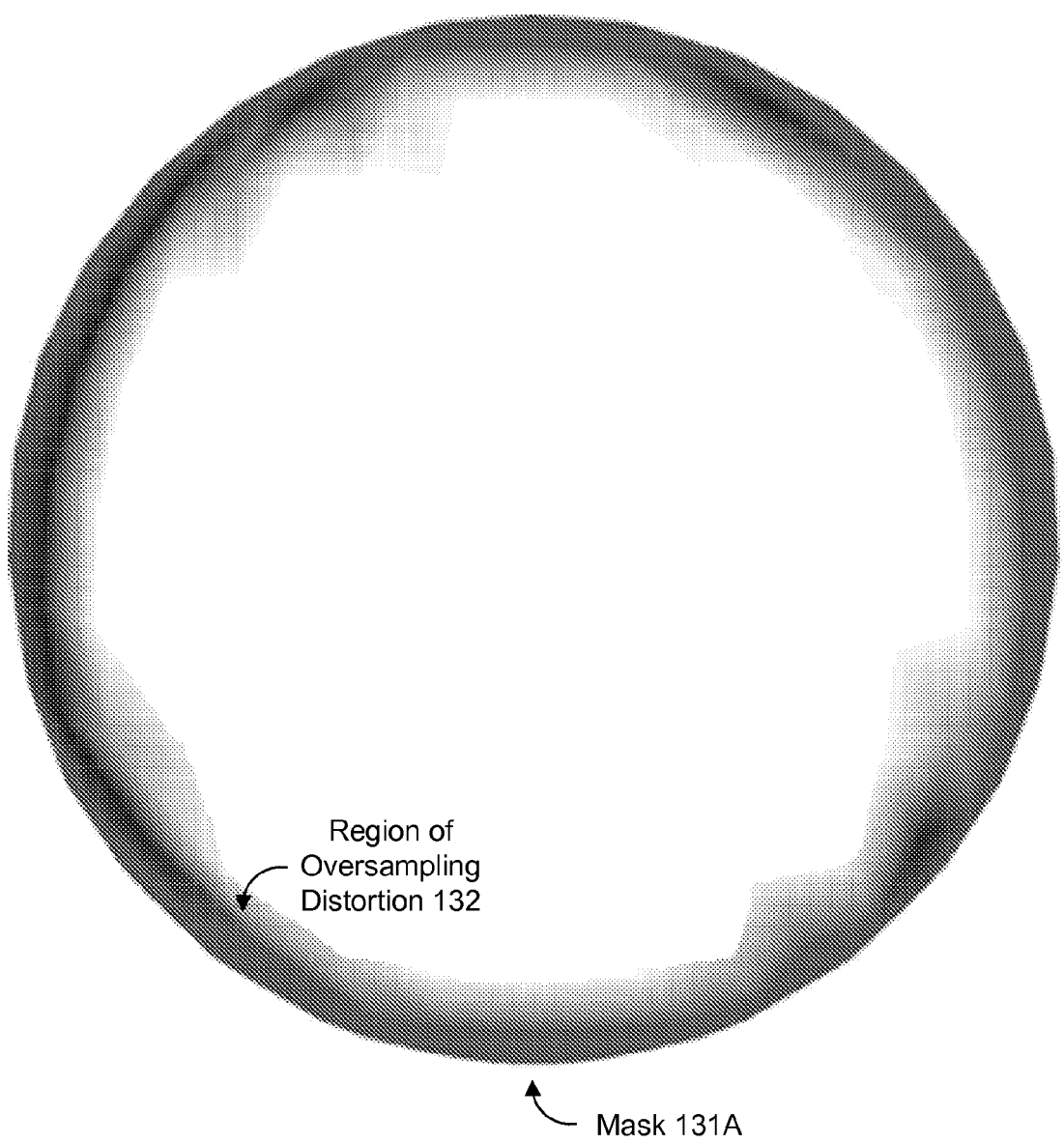
FIGS. 2A, 2B, and 2C illustrate examples of masks generated according to various embodiments.

FIG. 2A is a block diagram illustrating an example of a mask 131A generated according to the techniques for distortion-based mask generation described herein. The mask 131A may be generated by determining a distortion metric at various locations (e.g., vertices) of the sphere. In one embodiment, the mask 131A may include one or more regions of oversampling distortion 132. Oversampling distortion may occur where there is not enough pixel resolution in the two-dimensional screen representation to properly fill the larger pixel resolution of the corresponding location in the texture map of the three-dimensional object. For example, oversampling distortion may occur near the edge of the sphere at the current view, where the triangles in the surface rapidly curve away from the viewer due to their perspective. If these regions of oversampling distortion 132 were painted, and the object were then rotated so that the same regions 132 were in the center of the sphere, the paint in these regions 132 at the new view could appear excessively pixilated or "blocky."

Figure 2B:
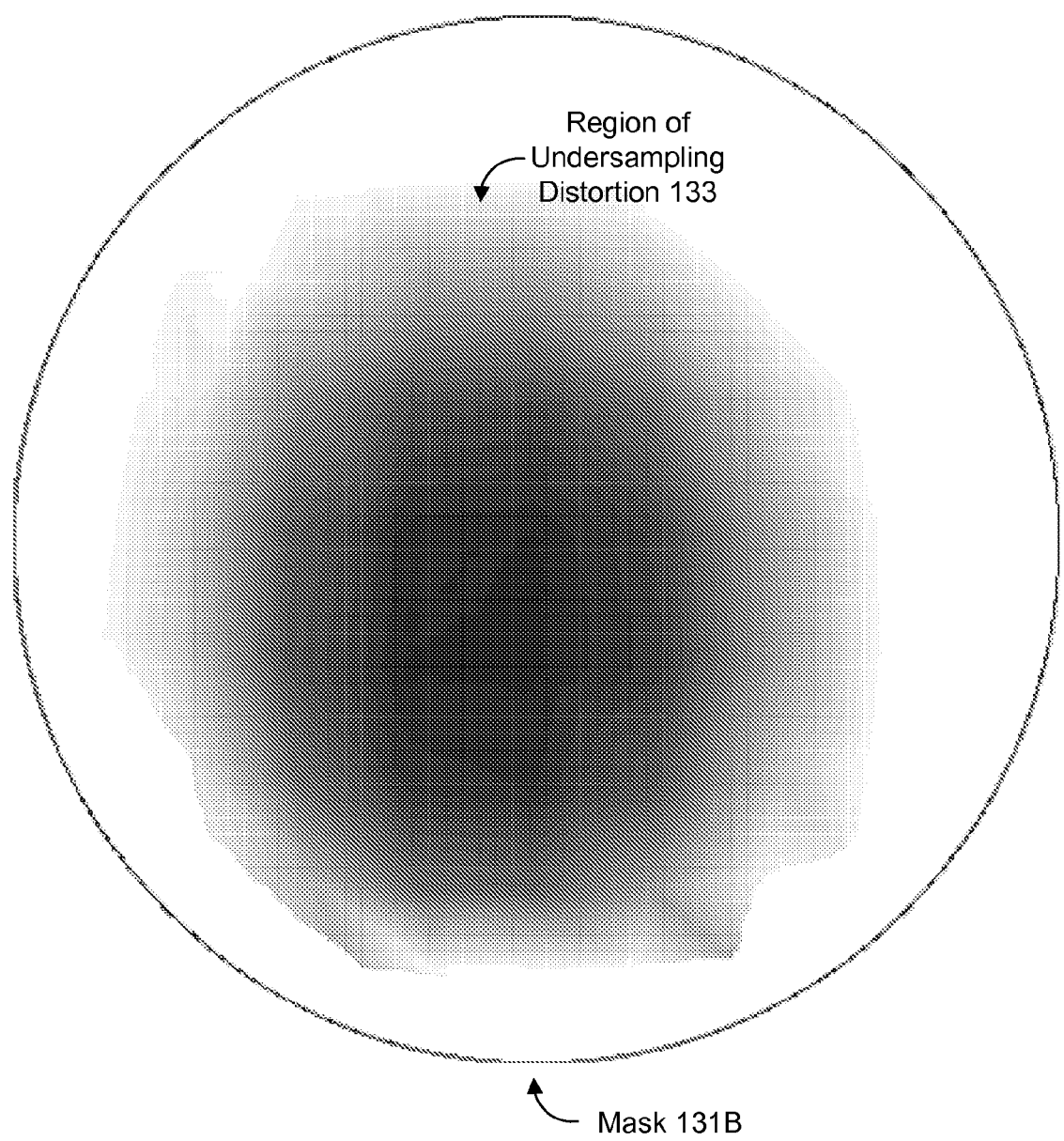

FIG. 2B is a block diagram illustrating an example of a mask 131B generated according to the techniques for distortion-based mask generation described herein. In one embodiment, the mask 131B may include one or more regions of undersampling distortion 133. Undersampling distortion may occur where there is not enough pixel resolution in the texture map of the three-dimensional object to properly accept the larger pixel resolution of the corresponding location in the two-dimensional screen representation. For example, undersampling distortion may occur near the center of the sphere at the current view, where the triangles in the surface mesh are orthogonal or nearly orthogonal to the viewer. If these regions of undersampling distortion 133 were painted at the current view, the paint in these regions 133 could appear excessively pixilated or "blocky."

Figure 2C:
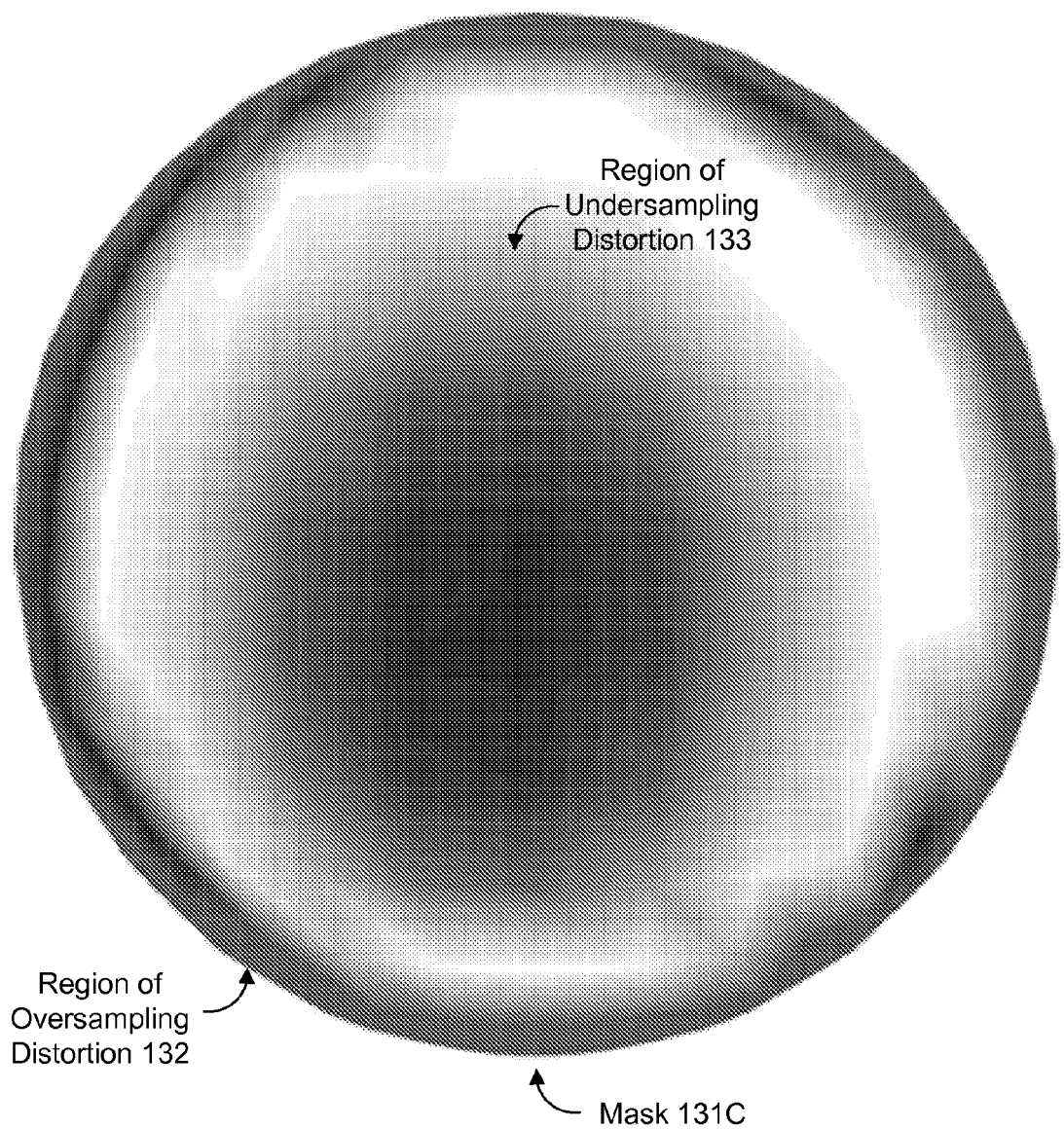

In one embodiment, the regions of oversampling distortion 132 and the regions of undersampling distortion 133 may combined in a single mask. FIG. 2C is a block diagram illustrating an example of a mask 131C generated according to the techniques for distortion-based mask generation described herein. The mask 131C may be displayed in a manner that includes a visual representation of the distortion and indicates both types of regions 132 and 133. In one embodiment, the visual representation of the distortion may include a "heat map" or a "color map" including a range of color values representing a range of values of the distortion metric. In one embodiment, the regions of oversampling distortion 132 may be indicated using a different set of colors than the regions of undersampling distortion 133.

The remaining regions within the boundaries of the two-dimensional representation of the sphere may have a relatively low distortion. As will be discussed in greater detail below, the distinction between regions of lower distortion (e.g., in which painting is permitted) and regions of higher distortion (e.g., in which painting is prohibited) may be based on a threshold value. The threshold value may be defined in a preferences file or otherwise predefined. In one embodiment, the threshold value may be modified by a user. In this manner, the mask 131C may act as a stencil to prevent paint from being applied to the both the regions of oversampling distortion 132 (as also illustrated in FIG. 2A) and the regions of undersampling distortion 133 (as also illustrated in FIG. 2B). In one embodiment, the mask may comprise a binary mask in which edits to various regions are either wholly permitted or wholly prohibited.

In one embodiment, the distortion-based mask generation functionality 130 described herein may be enabled while the image editor 100 is in a "select paintable areas" mode. The "select paintable areas" mode may be turned on or off by the user using suitable interface options (e.g., in a graphical user interface).

Figure 7:
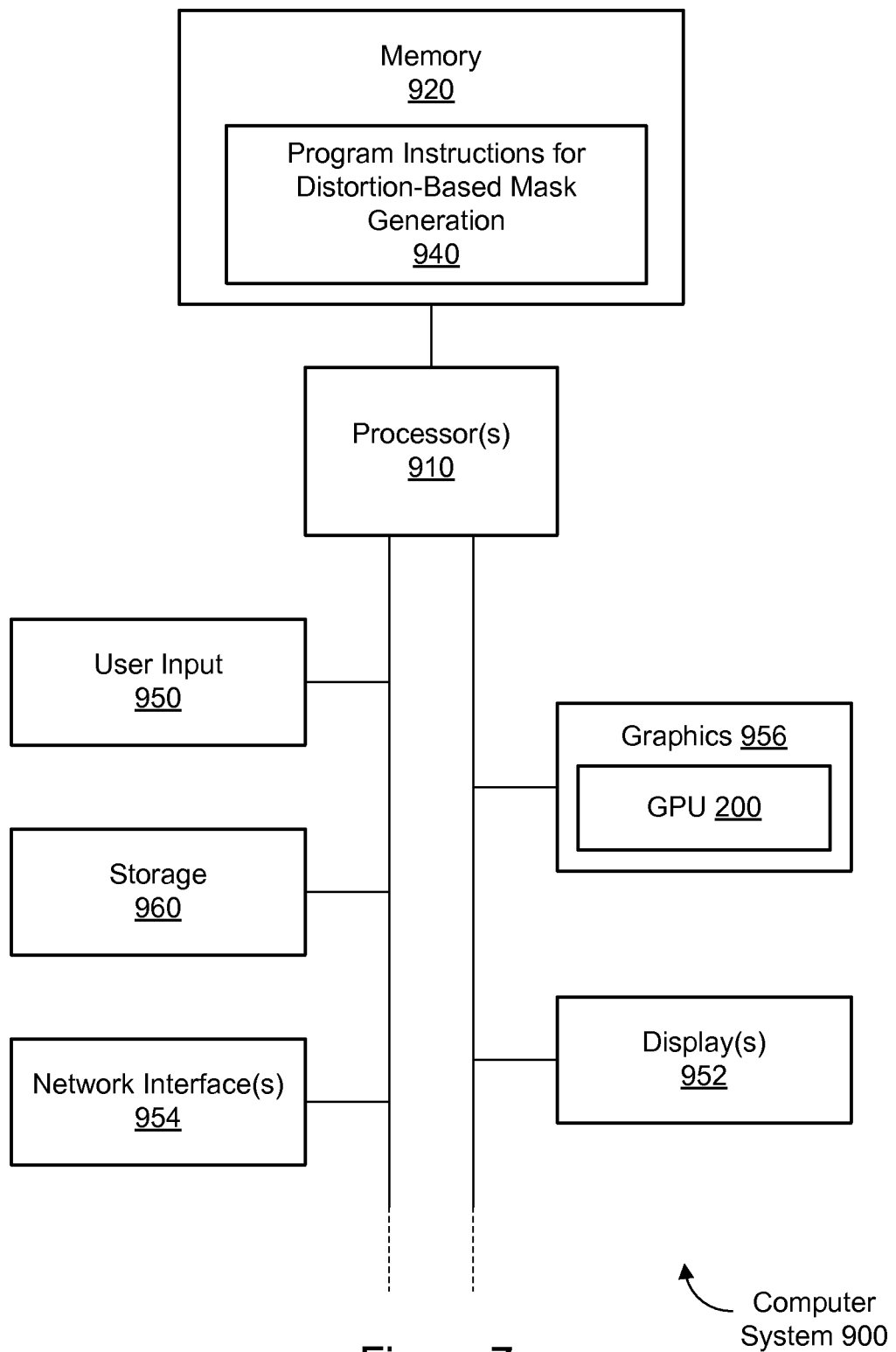
FIG. 7 is a block diagram illustrating constituent elements of a computer system that is configured to implement embodiments of the system and methods for distortion-based mask generation.

The editing operations 120 and distortion-based mask generation functionality 130 may comprise program instructions that may be executed in association with the image editor 100. In various embodiments, the program instructions that implement the editing operations 120 and the distortion-based mask generation functionality 130 may be coded as an intrinsic part of the image editor 100 or as a plug-in module or other extension to the image editor 100. The image editor 100 and its constituent elements and data may be stored in a memory 920 of a computer system 900 as illustrated in FIG. 7.

Figure 3:
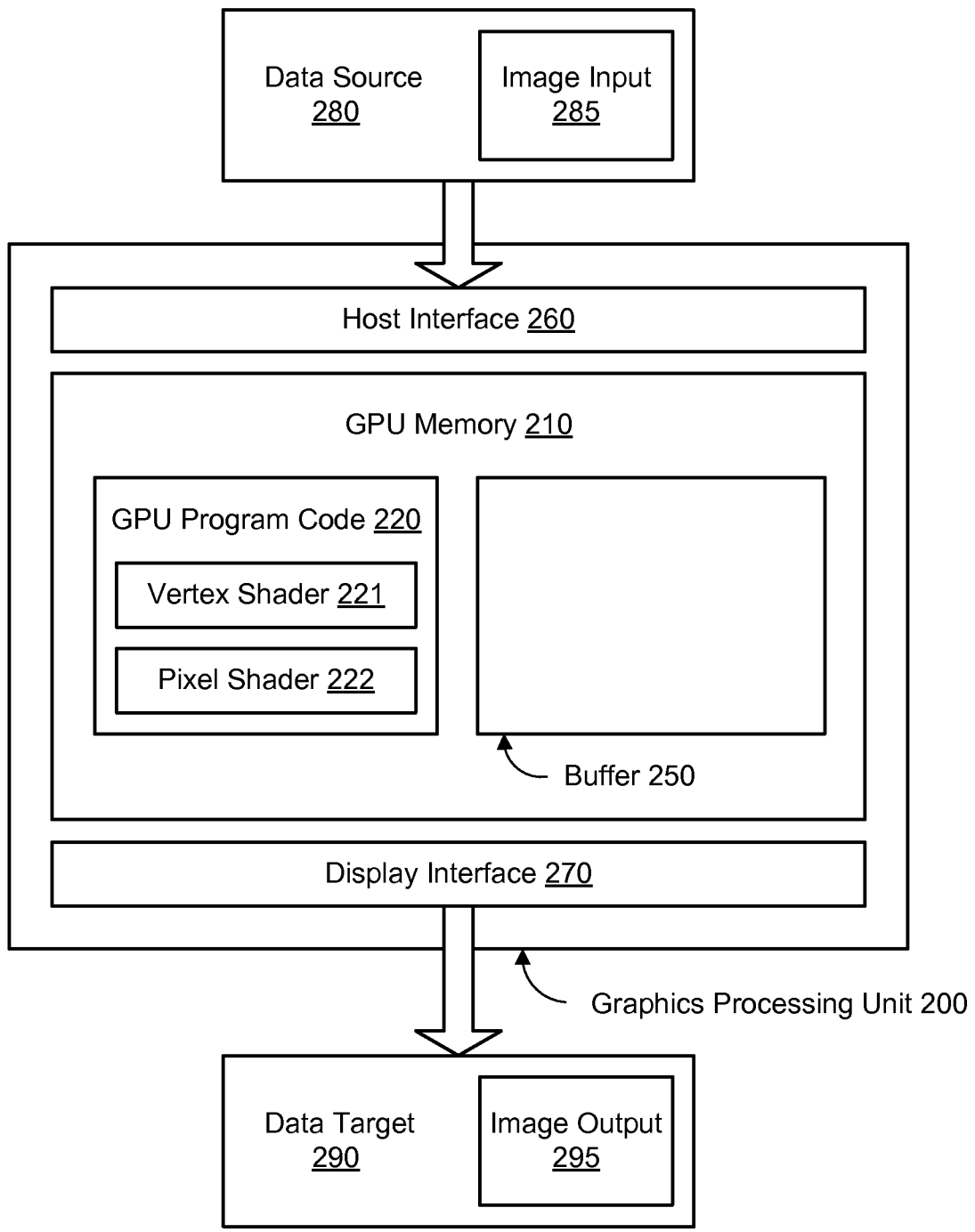
FIG. 3 is a block diagram illustrating one embodiment of a graphics processing unit (GPU) configured to render an image according to the techniques for distortion-based mask generation described herein.

FIG. 3 is a block diagram illustrating one embodiment of a graphics processing unit (GPU) 200 configured to render an image 110 according to the techniques for distortion-based mask generation described herein. The GPU 200, also referred to herein as a graphics processor, may comprise a dedicated graphics rendering device associated with a computer system. An example of a suitable computer system 900 for use with a GPU is illustrated in FIG. 7. Turning back to FIG. 3, the GPU 200 may include numerous specialized components configured to optimize the speed of rendering graphics output. For example, the GPU 200 may include specialized components for rendering three-dimensional models, for applying textures to surfaces, etc. For the sake of illustration, however, only a limited selection of components is shown in the example GPU 200 of FIG. 3. It is contemplated that GPU architectures other than the example architecture of FIG. 3 may be usable for implementing the techniques described herein. The GPU 200 may implement one or more application programmer interfaces (APIs) that permit programmers to invoke the functionality of the GPU. Suitable GPUs may be commercially available from vendors such as NVIDIA Corporation, ATI Technologies, and others.

The GPU 200 may include a host interface 260 configured to communicate with a data source 280 (e.g., a communications bus and/or processor(s) 910 of a host computer system 900). For example, the data source 280 may provide image input data 285 and/or executable program code to the GPU 200. In some embodiments, the host interface 260 may permit the movement of data in both directions between the GPU 200 and the data source 280. The GPU 200 may also include a display interface 270 for providing output data to a data target 290. The data target 290 may comprise an imaging device 952 such as a display or printer. For example, if data target 290 comprises a display device 952, the GPU 200 (along with other graphics components and/or interfaces 956) may "drive" the display 952 by providing graphics data at a particular rate from a screen buffer (e.g., the buffer 250).

In one embodiment, the GPU 200 may include internal memory 210. The GPU memory 210, also referred to herein as "video memory" or "VRAM," may comprise random-access memory (RAM) which is accessible to other GPU components. As will be described in greater detail below, the GPU memory 210 may be used in some embodiments to store various types of data and instructions such as input data, output data, intermediate data, program instructions for performing various tasks, etc. In one embodiment, the GPU 200 may also be configured to access a memory 920 of a host computer system 900 via the host interface 260.

In one embodiment, program instructions 940 may be stored in the memory 920 of the host computer system 900 and executed by the host computer system 900 to perform aspects of the distortion-based mask generation techniques discussed herein. For example, the host computer system 900 may send image input 285 (e.g., comprising three-dimensional image data 111 including a plurality of vertices) to the GPU 200.

In one embodiment, the GPU 200 may include GPU program code 220 that is executable by the GPU 200 to perform aspects of the distortion-based mask generation techniques discussed herein. Elements of the image input 285 may be rasterized to pixels during a rendering process including execution of the GPU program code 220 on the GPU 200. Elements of the GPU program code 220 may be provided to the GPU 200 by a host computer system (e.g., the data source 280) and/or may be native to the GPU 200. The GPU program code 220 may comprise a vertex shader 221 and/or a pixel shader 222. A vertex shader 221 comprises program instructions that are executable by the GPU 200 to determine properties (e.g., position) of a particular vertex. A vertex shader 221 may expect input such as uniform variables (e.g., constant values for each invocation of the vertex shader) and vertex attributes (e.g., per-vertex data). A pixel shader 222 comprises program instructions that are executable by the GPU 200 to determine properties (e.g., color) of a particular pixel. A pixel shader 222 may also be referred to as a fragment shader. A pixel shader 222 may expect input such as uniform variables (e.g., constant values for each invocation of the pixel shader) and pixel attributes (e.g., per-pixel data). In generating the image output 295, the vertex shader 221 and/or the pixel shader 222 may be executed at various points in the graphics pipeline. In one embodiment, the vertex shader 221 may be used to determine per-vertex distortion metrics in the image input 285; within a triangle, the distortion metrics may be interpolated between the values at the vertices. In one embodiment, the pixel shader 222 may be used to determine per-pixel distortion metrics in the image input 285.

The GPU memory 200 may comprise one or more buffers 250. Each buffer 250 may comprise a two-dimensional array of pixel data (e.g., color values) and/or pixel metadata (e.g., depth values, stencil values, etc.). For example, the GPU memory 210 may comprise an image buffer 250 that stores intermediate or final pixel values generated in the rendering process. In one embodiment, the image buffer 250 may comprise a single-sampling buffer wherein each pixel in the buffer is represented by a single set of color and alpha values (e.g., one color value for a red channel, one color value for a green channel, one color value for a blue channel, and appropriate values for a one or more alpha channels). In one embodiment, the image buffer 250 may comprise a multi-sampling buffer usable for anti-aliasing.

FIG. 4A is a flowchart illustrating a method for distortion-based mask generation according to one embodiment. As shown in 410, a respective distortion metric may be determined at each location of a plurality of locations in a two-dimensional representation of a three-dimensional object. The two-dimensional representation may be based on a view of the three-dimensional object. The view may include a particular position of the object. The view may include a particular screen resolution or zoom level. Each respective distortion metric may indicate a degree of distortion in a mapping between the respective location in the two-dimensional representation and a corresponding location in a surface texture of the three-dimensional object. For example, the distortion may comprise oversampling distortion and/or oversampling distortion.

In one embodiment, the distortion metric may be determined for each vertex (e.g., in the two-dimensional representation). In one embodiment, the distortion metric may be determined for each pixel (e.g., in the two-dimensional representation). In one embodiment, the distortion metric may be determined for each triangle or other polygon (e.g., in the two-dimensional representation).

As shown in 420, a visual representation of the respective distortion metric at one or more of the plurality of locations may be displayed. In one embodiment, a mask may be generated based on the respective distortion metric at each of the plurality of locations, and the visual representation may correspond to the mask. In one embodiment, displaying the visual representation may comprise superimposing the mask on the two-dimensional representation.

FIG. 4B is a flowchart illustrating further aspects of a method for distortion-based mask generation according to one embodiment. The operations shown in 410 and 420 may be performed as discussed above with respect to FIG. 4A. As shown in 430, the mask may be used to prevent the modification of pixel values at one or more locations where the distortion metric exceeds a distortion threshold. For example, after user input is received to apply paint to the three-dimensional object at the particular view, the mask may prevent application of the paint to at least one location at which the distortion metric exceeds the distortion threshold. In one embodiment, the mask may comprise a hard mask (e.g., a one-bit mask) In one embodiment, the mask may comprise a soft mask such that full modification of the pixel values may be prevented in some locations. However, partial modification may be permitted in those locations. The soft mask may comprise a range of intermediate values and may be implemented, for example, as an eight-bit mask. The soft mask may permit paint to be "faded" in some locations such as the borders between the regions of lower distortion and the regions of higher distortion.

Figure 5:
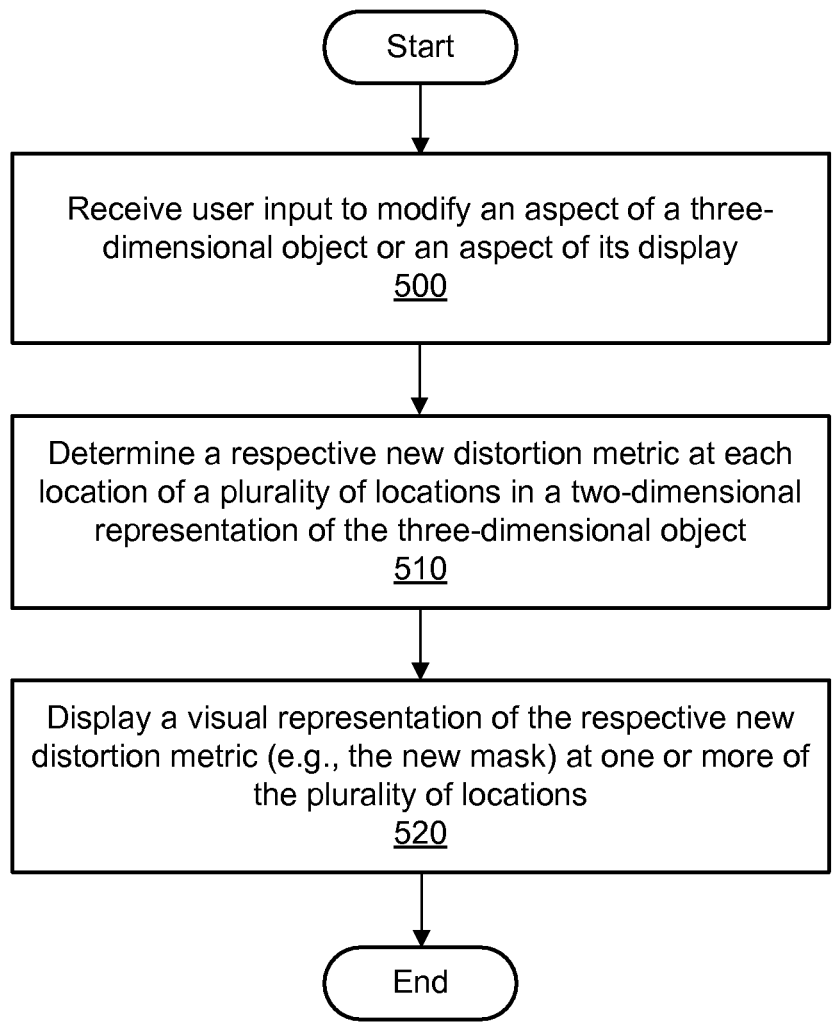
FIG. 5 is a flowchart illustrating a method for dynamically updating a distortion-based mask according to one embodiment.

In one embodiment, the distortion metrics and mask may be dynamically and automatically updated based on user interaction. FIG. 5 is a flowchart illustrating a method for dynamically updating a distortion-based mask according to one embodiment. As shown in 500, user input may be received to modify an aspect of the three-dimensional object or an aspect of its display. For example, the user input may comprise a modified view of the three-dimensional object (e.g., a modified position or a modified zoom level), a modified resolution of a texture of the three-dimensional object, and/or a modified parameterization of the three-dimensional object.

As shown in 510, a respective new distortion metric may be determined at each location of a plurality of locations in a two-dimensional representation of the three-dimensional object. The two-dimensional representation may differ from the original two-dimensional representation depending on the nature of the user input as shown in 500. A new mask may accordingly be generated. As shown in 520, a new visual representation of the respective new distortion metric at one or more of the plurality of locations may be displayed. The new visual representation of the new distortion metric may correspond to the new mask.

Figure 6:
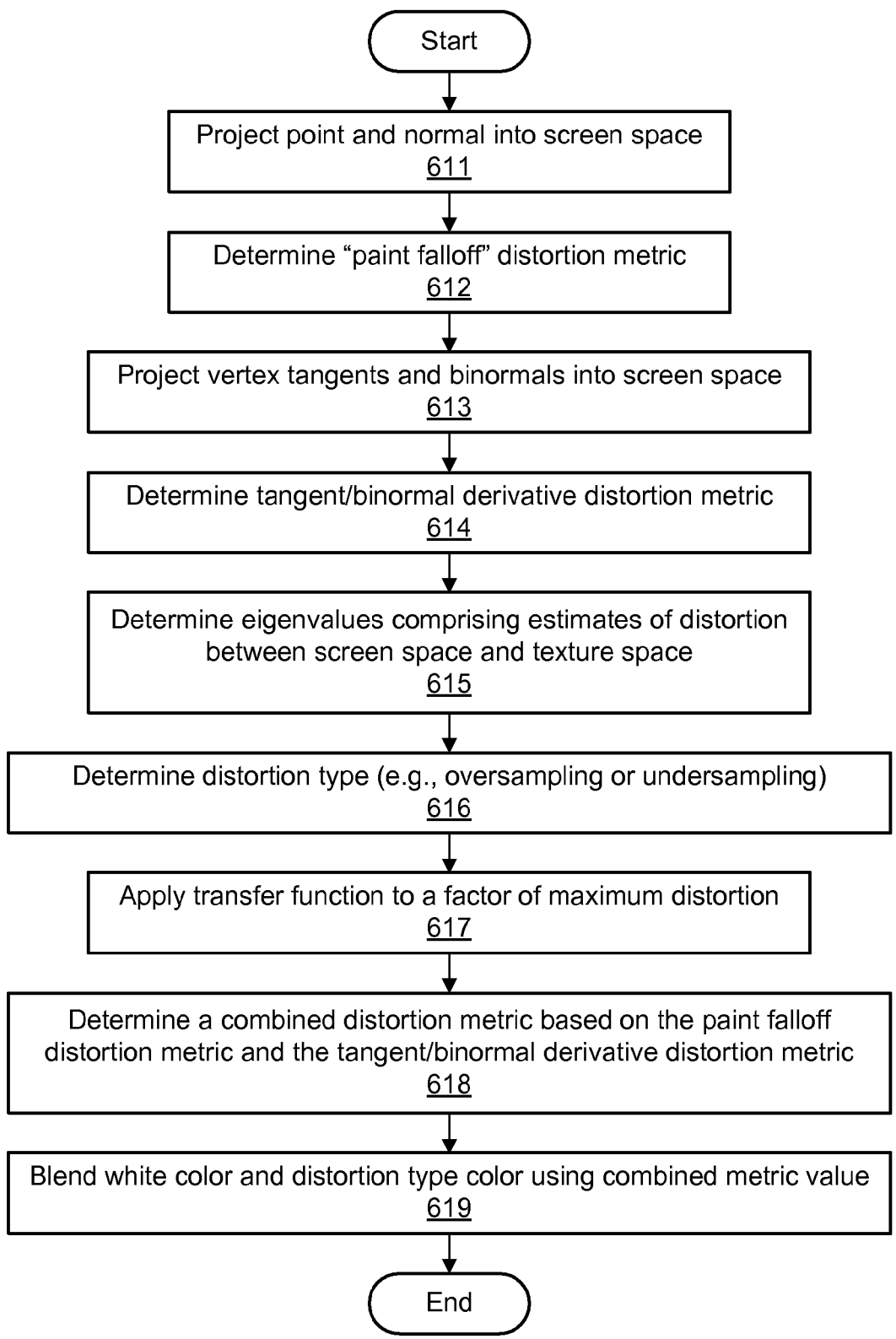
FIG. 6 is a flowchart illustrating further aspects of a method for distortion-based mask generation according to one embodiment.

FIG. 6 is a flowchart illustrating further aspects of a method for distortion-based mask generation according to one embodiment. The method illustrated in FIG. 6 may further illustrate aspects of the operation(s) shown in 410 of FIG. 4 and/or the operation(s) shown in 510 or FIG. 5 for determination of the distortion metric. In one embodiment, the operations shown in 611 through 619 may be performed for each vertex in the three-dimensional object.

As shown in 611, the point and normal may be projected from the 3D domain into screen space. In one embodiment, the projection may be performed using conventional techniques. In one embodiment, the operation(s) shown in 611 may be performed according to the following sequence of instructions, where vertOut.HPosition comprises the projected screen space position of the point, vertOut.fPosition comprises the camera space position of the point, app.vPosition comprises the XYZ coordinates of the processed vertex., app.vNormal comprises the XYZ coordinates of the normal of the processed vertex, modelViewProj comprises a product of the current Projection and the Transformation matrix, ModelView is the current Transformation matrix, and normalVec is the normal vector calculated in camera space rather than world space:

```
vertOut.HPosition = mul(modelViewProj, app.vPosition);
vertOut.fPosition = mul(modelView,app.vPosition).xyz;
float3 normalVec;
float3 ecPosition3 = (mul(modelView,app.vPosition).xyz);
float4 v1 = app.vPosition+app.vNormal;
v1.w = 1.0;
float3 ecPosition3_1 = (mul(modelView,v1).xyz);
normalVec = normalize(ecPosition3_1−ecPosition3)
```

In one embodiment, the operation(s) shown in 611 may be performed according to the following instruction prior to projecting the normal:

```
cameraSpaceNormal=modelView_inversetranspose*world
    SpaceNormal
```

In one embodiment, the operation(s) shown in 611 may be performed according to the following instructions prior to performing a homogeneous divide and subtraction to compute the correct projected screen space normal:

```
p0 = world position
p1 = p0 + normal;
projectedP0 = modelviewProject * p0;
projectedP1 = modelviewProject * p1
```

As shown in 612, a "paint falloff" distortion metric may be determined based on the orientation of the projected normal. The "paint falloff" metric may indicate oversampling distortion as illustrated in FIG. 2A. In one embodiment, the operation(s) shown in 612 may be performed according to the following sequence of instructions:

```
float paintFaloff = abs(normalVec.z);
float paintFalloffTransfer=1.0−smoothstep(fadeMaxThreshold,
    fadeMinThreshold, paintFaloff)
```

As shown in 613, the vertex tangents and binormals may be projected from 3D to 2D (i.e., screen space). The coordinate system of a texture map may be defined in a (u, v) coordinate system. The vertex tangents and binomials may represent a world-space derivative of the (u, v) parameterization of the triangle. The vertex tangents and binomials may comprise vectors in 3D space that describe the change of texture coordinate parameterization per triangle. In one embodiment, a 'u' tangent is a differential ratio of incremental motion in world space relative to a differential change in 'u,' and a 'v' tangent is a differential ratio of incremental motion in world space relative to a differential change in 'v.' A binormal may indicate what direction and how far along the surface one must move to have a unit change in 'v'. In one embodiment, the operation(s) shown in 613 may be performed according to the following sequence of instructions:

```
float4 P = app.vPosition;
P.w = 1.0;
float4 P1T = app.vPosition+app.vFaceTangent;
P1T.w = 1.0;
float4 P1B = app.vPosition+app.vFaceBinormal;
P1B.w = 1.0;
float4 P0T = app.vPosition-app.vFaceTangent;
P0T.w = 1.0;
float4 P0B = app.vPosition-app.vFaceBinormal;
P0B.w = 1.0;
float4 projP0T = mul(modelViewProj, P0T);
float4 projP0B = mul(modelViewProj, P0B);
float4 projP1T = mul(modelViewProj, P1T);
float4 projP1B = mul(modelViewProj, P1B);
float2 pP0T = projP0T.xy/projP0T.w;
float2 pP1T = projP1T.xy/projP1T.w;
float2 pP0B = projP0B.xy/projP0B.w;
float2 pP1B = projP1B.xy/projP1B.w
```

As shown in 614, a distortion metric based on the projection of the vertex tangent and binormal may be determined. In one embodiment, central derivatives may be computed and their values adjusted to the screen size and texture size. In one embodiment, the operation(s) shown in 613 and/or 614 may be performed using GPU-specific commands for measuring derivatives, such as commands executable by the pixel shader. In one embodiment, the operation(s) shown in 614 may be performed according to the following sequence of instructions:

```
float2 dSdu = (pP1T-pP0T)*(uivScreenSize/uivTextureSize.xx);
float2 dSdv = (pP1B-pP0B)*(uivScreenSize/uivTextureSize.yy)
```

As shown in 615, the eigenvalues lambda_min and lambda max may be computed. The eigenvalues lambda_min and lambda_max may comprise estimates of distortion between screen space and texture space. In one embodiment, the operation(s) shown in 615 may be performed according to the following sequence of instructions, where the eigenvalues may be with respect to the matrix $$\begin{bmatrix} a & b \\ c & d \end{bmatrix}:$$

```
float a = dSdu.x;
float b = dSdv.x;
float c = dSdu.y;
float d = dSdv.y;
float sqD = sqrt((a-d)*(a-d)+4*b*c);
float lambda_min = abs((a+d-sqD)*0.5);
float temp_swap = lambda_min;
float lambda_max = abs((a+d+sqD)*0.5);
if (lambda_min>lambda_max)
{
    lambda_min = lambda_max;
    lambda_max = temp_swap
}
```

As shown in 616, the distortion type of the current location may be determined based on the values of lambda_min and lambda_max. For example, if lambda_max<1, then the distortion at the current location may comprise oversampling distortion; a factor of maximum distortion may be set to 1/lambda_min. If lambda_min>1, then the distortion at the current location may comprise undersampling distortion; a factor of maximum distortion may be set to lambda_max. In one embodiment, the operation(s) shown in 616 may be performed according to the following sequence of instructions:

```
float factor = 0;
float threshold_factor = 4.0;
float3 heatmap_color = float3(1, 0, 0);
if (lambda_max<1)
{ //Oversample case:
    factor = 1/lambda_min;
    heatmap_color = float3(1, 0, 0);
}
if (lambda_min>1)
{ //Undersample case:
    factor = lambda_max;
    heatmap_color = float3(0, 0, 1);
}
float t = (factor-1)/(threshold_factor-1);
float transfer_t
```

As shown in 617, a transfer function may be applied to the factor of maximum distortion. The transfer function may be used to map values of the factor to values of the color indicating a degree of distortion. In one embodiment, if the factor is close to 1, then the location is indicated as having relatively low distortion (e.g., paintable using the mask). In one embodiment, if the factor is less than 0.5, then the transfer value is maintained at 0. In one embodiment, if the factor is closer to a value such as 4 or more, then the location is indicated as having higher distortion (e.g., not paintable using the mask). The transfer function may vary in different embodiments. In one embodiment, the operation(s) shown in 617 may be performed according to the following instruction:

transfer_t=smoothstep(0.5, 1.0, t)

As shown in 618, a combined distortion metric is generated based on (e.g., as a product of) the paint falloff distortion metric and the tangent/binormal derivative distortion metric. In one embodiment, the operation(s) shown in 618 may be performed according to the following sequence of instructions:

```
float combined_metric_t = 1.0 - (1.0-transfer_t)*
(1.0-paintFalloffTransfer);
float3 metric = lerp(float3(1, 1, 1), heatmap_color, combined_metric_t);
vertOut.fColor = metric.rgbr;
vertOut.fBackColor = metric.rgbr;
return vertOut
```

As shown in 619, to generate the color of the location in the mask, the white color and oversampling/undersampling color may be blended using the combined metric value determined in 618. After the operations shown in 611 through 619 have been performed for every relevant location (e.g., vertex), the mask may be displayed and used to enable painting of the low-distortion areas as discussed above.

FIG. 7 is a block diagram illustrating constituent elements of a computer system 900 that is configured to implement embodiments of the systems and methods described herein. The computer system 900 may include one or more processors 910 implemented using any desired architecture or chip set, such as the SPARC™ architecture, an x86-compatible architecture from Intel Corporation or Advanced Micro Devices, or an other architecture or chipset capable of processing data. Any desired operating system(s) may be run on the computer system 900, such as various versions of Unix, Linux, Windows® from Microsoft Corporation, MacOS® from Apple Inc., or any other operating system that enables the operation of software on a hardware platform. The processor(s) 910 may be coupled to one or more of the other illustrated components, such as a memory 920, by at least one communications bus.

In one embodiment, a specialized graphics card or other graphics component 956 may be coupled to the processor(s) 910. The graphics component 956 may include a graphics processing unit (GPU) 200. Additionally, the computer system 900 may include one or more imaging devices 952. The one or more imaging devices 952 may include various types of raster-based imaging devices such as monitors and printers. In one embodiment, one or more display devices 952 may be coupled to the graphics component 956 for display of data provided by the graphics component 956.

In one embodiment, program instructions 940 that may be executable by the processor(s) 910 to implement aspects of the techniques described herein may be partly or fully resident within the memory 920 at the computer system 900 at any point in time. The memory 920 may be implemented using any appropriate medium such as any of various types of ROM or RAM (e.g., DRAM, SDRAM, RDRAM, SRAM, etc.), or combinations thereof. The program instructions may also be stored on a storage device 960 accessible from the processor(s) 910. Any of a variety of storage devices 960 may be used to store the program instructions 940 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage 960 may be coupled to the processor(s) 910 through one or more storage or I/O interfaces. In some embodiments, the program instructions 940 may be provided to the computer system 900 via any suitable computer-readable storage medium including the memory 920 and storage devices 960 described above.

The computer system 900 may also include one or more additional I/O interfaces, such as interfaces for one or more user input devices 950. In addition, the computer system 900 may include one or more network interfaces 954 providing access to a network. It should be noted that one or more components of the computer system 900 may be located remotely and accessed via the network. The program instructions may be implemented in various embodiments using any desired programming language, scripting language, or combination of programming languages and/or scripting languages, e.g., C, C++, C#, Java™, Perl, etc. The computer system 900 may also include numerous elements not shown in FIG. 7, as illustrated by the ellipsis.

In various embodiments, the elements shown in FIGS. 4A, 4B, 5, and 6 may be performed in a different order than the illustrated order. In FIGS. 4A, 4B, 5, and 6, any of the operations described in the elements may be performed programmatically (i.e., by a computer according to a computer program). In FIGS. 4A, 4B, 5, and 6, any of the operations described in the elements may be performed automatically (i.e., without user intervention).

Although the embodiments above have been described in detail, numerous variations and modifications will become apparent to those skilled in the art once the above disclosure is fully appreciated. It is intended that the following claims be interpreted to embrace all such variations and modifications.

What is claimed is:

1. A computer-implemented method, comprising:
determining a respective distortion metric at each location of a plurality of locations in a two-dimensional representation of a three-dimensional object, the two-dimensional representation based on a view of the three-dimensional object, each respective distortion metric indicating a degree of distortion in a mapping between the respective location in the two-dimensional representation and a corresponding location in a surface texture of the three-dimensional object, and each respective distortion metric comprising a product of at least two different techniques for measuring the degree of distortion;
displaying a visual representation of the respective distortion metric at one or more of the plurality of locations in the two-dimensional representation of the three-dimensional object;
receiving input to modify one or more pixel values of the three-dimensional object at the view; and
preventing modification of the one or more pixel values based on the respective distortion metric exceeding a distortion threshold in the one or more of the plurality of locations corresponding to the one or more pixel values.

2. The method as recited in claim 1, further comprising:
receiving additional input to modify one or more additional pixel values of the three-dimensional object at the view; and
preventing full modification and allowing partial modification of the one or more additional pixel values based on the respective distortion metric in the one or more of the plurality of locations corresponding to the one or more additional pixel values.

3. The method as recited in claim 1, further comprising:
generating a mask based on the respective distortion metric at each location of the plurality of locations in the two-dimensional representation of the three-dimensional object;
wherein the modification of the one or more pixel values is prevented using the mask.

4. The method as recited in claim 1, further comprising:
receiving input comprising a modified view of the three-dimensional object, wherein the modified view comprises a modified position or a modified zoom level;
determining a respective new distortion metric at each location of a plurality of locations in a new two-dimensional representation of the three-dimensional object, wherein the new two-dimensional representation is based on the modified view of the three-dimensional object, and wherein each respective new distortion metric indicates a degree of distortion in a mapping between the respective location in the new two-dimensional representation and the corresponding location in the surface texture of the three-dimensional object; and
automatically displaying a visual representation of the respective new distortion metric at one or more of the plurality of locations in the new two-dimensional representation of the three-dimensional object.

5. The method as recited in claim 1, further comprising:
receiving input comprising a modified resolution of a texture of the three-dimensional object;
determining a respective new distortion metric at each location of the plurality of locations in the two-dimensional representation of the three-dimensional object, wherein each respective new distortion metric indicates a degree of distortion in the mapping between the respective location in the two-dimensional representation and the corresponding location in the surface texture of the three-dimensional object; and
automatically displaying a visual representation of the respective new distortion metric at one or more of the plurality of locations in the two-dimensional representation of the three-dimensional object.

6. The method as recited in claim 1, further comprising:
receiving input comprising a modified parameterization of the three-dimensional object;
determining a respective new distortion metric at each location of the plurality of locations in the two-dimensional representation of the three-dimensional object, wherein each respective new distortion metric indicates a degree of distortion in the mapping between the respective location in the two-dimensional representation and the corresponding location in the surface texture of the three-dimensional object; and
automatically displaying a visual representation of the respective new distortion metric at one or more of the plurality of locations in the two-dimensional representation of the three-dimensional object.

7. The method as recited in claim 1, wherein the distortion comprises an undersampling distortion.

8. The method as recited in claim 1, wherein the distortion comprises an oversampling distortion.

9. The method as recited in claim 1, wherein the respective distortion metric at each location of the plurality of locations is determined using a graphics processing unit (GPU).

10. The method as recited in claim 1, wherein each location of the plurality of locations comprises a respective vertex in the two-dimensional representation of the three-dimensional object at the view.

11. The method as recited in claim 1, wherein each location of the plurality of locations comprises a respective pixel in the two-dimensional representation of the three-dimensional object at the view.

12. The method as recited in claim 1, wherein each location of the plurality of locations comprises a respective polygon in the two-dimensional representation of the three-dimensional object at the view.

13. A computer-readable storage media device, storing program instructions that are computer-executable to implement operations comprising:
determining a respective distortion metric at each location of a plurality of locations in a two-dimensional representation of a three-dimensional object, the two-dimensional representation based on a view of the three-dimensional object, each respective distortion metric indicating a degree of distortion in a mapping between the respective location in the two-dimensional representation and a corresponding location in a surface texture of the three-dimensional object, and each respective distortion metric comprising a product of at least two different techniques for measuring the degree of distortion and determined based in part on a camera position corresponding to the view of the three-dimensional object and a screen resolution at which the two-dimensional representation is viewed;
displaying a visual representation of the respective distortion metric at one or more of the plurality of locations in the two-dimensional representation of the three-dimensional object;
receiving input to modify one or more pixel values of the three-dimensional object at the view; and
preventing modification of the one or more pixel values based on the respective distortion metric exceeding a distortion threshold in the one or more of the plurality of locations corresponding to the one or more pixel values.

14. The computer-readable storage media device as recited in claim 13, wherein the operations further comprise:
receiving additional input to modify one or more additional pixel values of the three-dimensional object at the view; and
preventing full modification and allowing partial modification of the one or more additional pixel values based on the respective distortion metric in the one or more of the plurality of locations corresponding to the one or more additional pixel values.

15. The computer-readable storage media device as recited in claim 13, wherein the operations further comprise:
generating a mask based on the respective distortion metric at each location of the plurality of locations in the two-dimensional representation of the three-dimensional object;
wherein the modification of the one or more pixel values is prevented using the mask.

16. The computer-readable storage media device as recited in claim 13, wherein the operations further comprise:
receiving input comprising a modified view of the three-dimensional object, wherein the modified view comprises a modified position or a modified zoom level;
determining a respective new distortion metric at each location of a plurality of locations in a new two-dimensional representation of the three-dimensional object, wherein the new two-dimensional representation is based on the modified view of the three-dimensional object, and wherein each respective new distortion metric indicates a degree of distortion in a mapping between the respective location in the new two-dimensional representation and the corresponding location in the surface texture of the three-dimensional object; and
automatically displaying a visual representation of the respective new distortion metric at one or more of the plurality of locations in the new two-dimensional representation of the three-dimensional object.

17. The computer-readable storage media device as recited in claim 13, wherein the operations further comprise:
receiving input comprising a modified resolution of a texture of the three-dimensional object;
determining a respective new distortion metric at each location of the plurality of locations in the two-dimensional representation of the three-dimensional object, wherein each respective new distortion metric indicates a degree of distortion in the mapping between the respective location in the two-dimensional representation and the corresponding location in the surface texture of the three-dimensional object; and
automatically displaying a visual representation of the respective new distortion metric at one or more of the plurality of locations in the two-dimensional representation of the three-dimensional object.

18. The computer-readable storage media device as recited in claim 13, wherein the operations further comprise:
receiving input comprising a modified parameterization of the three-dimensional object;
determining a respective new distortion metric at each location of the plurality of locations in the two-dimensional representation of the three-dimensional object, wherein each respective new distortion metric indicates a degree of distortion in the mapping between the respective location in the two-dimensional representation and the corresponding location in the surface texture of the three-dimensional object; and
automatically displaying a visual representation of the respective new distortion metric at one or more of the plurality of locations in the two-dimensional representation of the three-dimensional object.

19. The computer-readable storage media device as recited in claim 13, wherein the distortion comprises an undersampling distortion.

20. The computer-readable storage media device as recited in claim 13, wherein the distortion comprises an oversampling distortion.

21. The computer-readable storage media device as recited in claim 13, wherein the respective distortion metric at each location of the plurality of locations is determined using a graphics processing unit (GPU).

22. The computer-readable storage media device as recited in claim 13, wherein each location of the plurality of locations comprises a respective vertex in the two-dimensional representation of the three-dimensional object at the view.

23. The computer-readable storage media device as recited in claim 13, wherein each location of the plurality of locations comprises a respective pixel in the two-dimensional representation of the three-dimensional object at the view.

24. The computer-readable storage media device as recited in claim 13, wherein each location of the plurality of locations comprises a respective polygon in the two-dimensional representation of the three-dimensional object at the view.

25. A system, comprising:
at least one processor; and
a memory coupled to the at least one processor, the memory configured to store program instructions that are executable by the at least one processor to:
determine a respective distortion metric at each location of a plurality of locations in a two-dimensional representation of a three-dimensional object, the two-dimensional representation based on a view of the three-dimensional object, each respective distortion metric configured to indicate a degree of distortion in a mapping between the respective location in the two-dimensional representation and a corresponding location in a surface texture of the three-dimensional object, and each respective distortion metric determined as a product of at least two different techniques for measuring the degree of distortion;
display a visual representation of the respective distortion metric at one or more of the plurality of locations in the two-dimensional representation of the three-dimensional object;
receive input to modify one or more pixel values of the three-dimensional object at the view; and
prevent modification of the one or more pixel values based on the respective distortion metric exceeding a distortion threshold in the one or more of the plurality of locations corresponding to the one or more pixel values.

26. The system as recited in claim 25, wherein the program instructions are further executable by the at least one processor to:
receive additional input to modify one or more additional pixel values of the three-dimensional object at the view; and
prevent full modification and allow partial modification of the one or more additional pixel values based on the respective distortion metric in the one or more of the plurality of locations corresponding to the one or more additional pixel values.

27. The system as recited in claim 25, wherein the program instructions are further executable by the at least one processor to:
generate a mask based on the respective distortion metric at each location of the plurality of locations in the two-dimensional representation of the three-dimensional object;
wherein the modification of the one or more pixel values is prevented using the mask.

28. The system as recited in claim 25, wherein the program instructions are further executable by the at least one processor to:
receive input comprising a modified view of the three-dimensional object, wherein the modified view comprises a modified position or a modified zoom level;
determine a respective new distortion metric at each location of a plurality of locations in a new two-dimensional representation of the three-dimensional object, wherein the new two-dimensional representation is based on the modified view of the three-dimensional object, and wherein each respective new distortion metric indicates a degree of distortion in a mapping between the respective location in the new two-dimensional representation and the corresponding location in the surface texture of the three-dimensional object; and
automatically display a visual representation of the respective new distortion metric at one or more of the plurality of locations in the new two-dimensional representation of the three-dimensional object.

29. The system as recited in claim 25, wherein the program instructions are further executable by the at least one processor to:
receive input comprising a modified resolution of a texture of the three-dimensional object;
determine a respective new distortion metric at each location of the plurality of locations in the two-dimensional representation of the three-dimensional object, wherein each respective new distortion metric indicates a degree of distortion in the mapping between the respective location in the two-dimensional representation and the corresponding location in the surface texture of the three-dimensional object; and
automatically display a visual representation of the respective new distortion metric at one or more of the plurality of locations in the two-dimensional representation of the three-dimensional object.

30. The system as recited in claim 25, wherein the program instructions are further executable by the at least one processor to:
receive input comprising a modified parameterization of the three-dimensional object;
determine a respective new distortion metric at each location of the plurality of locations in the two-dimensional representation of the three-dimensional object, wherein each respective new distortion metric indicates a degree of distortion in the mapping between the respective location in the two-dimensional representation and the corresponding location in the surface texture of the three-dimensional object; and
automatically display a visual representation of the respective new distortion metric at one or more of the plurality of locations in the two-dimensional representation of the three-dimensional object.

31. The system as recited in claim 25, wherein the distortion comprises an undersampling distortion.

32. The system as recited in claim 25, wherein the distortion comprises an oversampling distortion.

33. The system as recited in claim 25, wherein the respective distortion metric at each location of the plurality of locations is determined using a graphics processing unit (GPU).

34. The system as recited in claim 25, wherein each location of the plurality of locations comprises a respective vertex in the two-dimensional representation of the three-dimensional object at the view.

35. The system as recited in claim 25, wherein each location of the plurality of locations comprises a respective pixel in the two-dimensional representation of the three-dimensional object at the view.

36. The system as recited in claim 25, wherein each location of the plurality of locations comprises a respective polygon in the two-dimensional representation of the three-dimensional object at the view.

* * * * *